No. 760,150. PATENTED MAY 17, 1904.
S. O. RICHARDSON, Jr.
ART OF MANUFACTURING HOLLOW GLASS ARTICLES.
APPLICATION FILED FEB. 10, 1904.
NO MODEL.

Witnesses
Chas. M. Dayton.
B. L. Chadwell.

Inventor:
S. O. Richardson, Jr.
By Raymond & Barnett
Attorneys.

THE NORRIS PETERS CO., PHOTO-LITHO., WASHINGTON, D. C.

No. 760,150. Patented May 17, 1904.

UNITED STATES PATENT OFFICE.

SOLON O. RICHARDSON, JR., OF TOLEDO, OHIO.

ART OF MANUFACTURING HOLLOW GLASS ARTICLES.

SPECIFICATION forming part of Letters Patent No. 760,150, dated May 17, 1904.

Application filed February 10, 1904. Serial No. 192,993. (No model.)

*To all whom it may concern:*

Be it known that I, SOLON O. RICHARDSON, Jr., a citizen of the United States, residing at Toledo, in the county of Lucas and State of Ohio, have invented certain new and useful Improvements in the Art of Manufacturing Hollow Glass Articles, of which the following is a specification.

My invention relates to improvements in the art of manufacturing hollow glass articles.

The object of my invention is to facilitate the manufacture of hollow glass articles at one heat, and an especial object of my invention is to improve the process of manufacturing glass articles in molds so as to get better results, and particularly so as to insure a smoothly-finished surface. These and such other objects as may hereinafter appear are attained by my improved process, which may be conveniently practiced by the apparatus illustrated in the accompanying drawings, in which—

Figure 1:
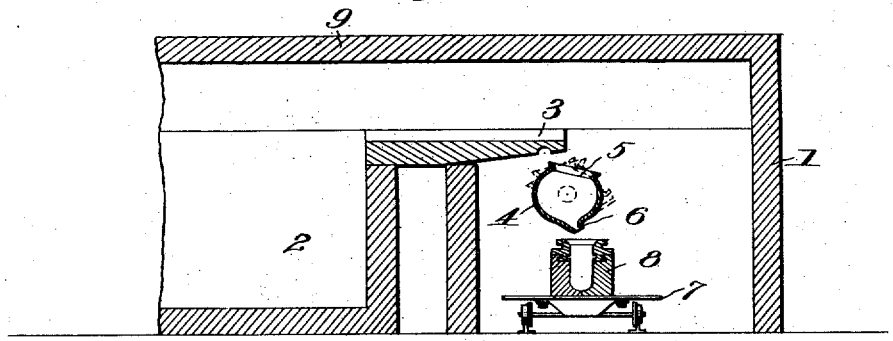
Figure 2:
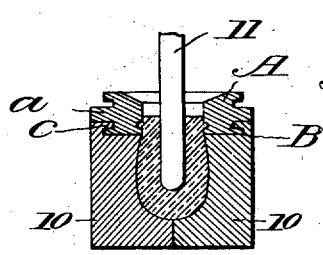
Figure 3:
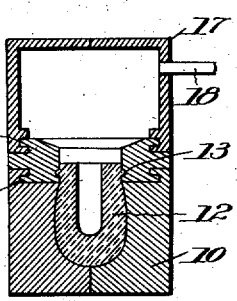
Figure 5:
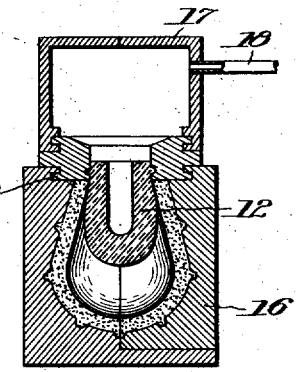
Figure 4:
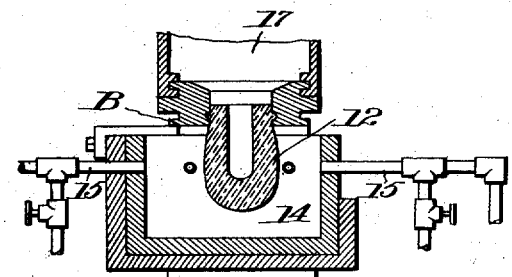
Figure 6:
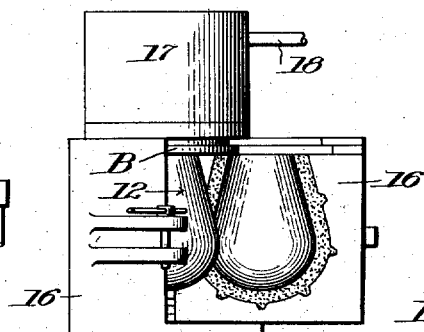

Figure 1 is a sectional view of a part of a furnace, such as is shown in my copending application, Serial No. 185,804, filed December 19, 1903, upon which has issued my Patent No. 756,895, dated April 12, 1904. Fig. 2 is an enlarged sectional detail showing a second step in my process. Fig. 3 is a sectional detail showing the blank in the mold after the step shown in Fig. 2. Fig. 4 is a sectional detail illustrating the reheating step in my process. Fig. 5 is a sectional detail showing a convenient means for completing the formation of a glass article by my process, and Fig. 6 is an elevation showing the completed article in a partially-opened mold.

Like characters of reference indicate the same parts in the several figures of the drawings.

Referring to the accompanying drawings, 1 indicates the walls of a furnace provided with a working chamber 2, from which the metal is caused to flow through a spout 3 into a pivotally-mounted ladle 4. The ladle 4 is provided with an inlet-opening 5 and with an axis 6 and is so mounted that it may be readily tipped upon its longitudinal axis by any convenient mechanism—such, for instance, as that shown more in detail in my said copending application.

7 is a truck arranged to be moved into and out of the casting-chamber 8 of the furnace, said casting-chamber 8 being under the same arch 9 which extends over the working and reducing chambers of the furnace and being kept heated by any suitable means.

Mounted upon the truck 7 is a familiar form of mold comprising an upper section 9 and a lower section 10, each of said sections being also split vertically, as shown, and being separable from each other. The upper section 9 in the form of mold as shown is provided with a nipple A at its upper end and a similar nipple B at its lower end. The lower section 10 is provided at its upper end with an undercut collar C, adapted to engage the nipple B when the halves of the lower section are clamped together. Metal is cast in the mold from the ladle 4 within the casting-chamber 8 in the presence of a high temperature, the mold being but partially filled, as shown in Fig. 1. The mold is then placed under any suitable press, (not shown,) the plunger 11 of which (*vide* Fig. 2) is pressed into the metal, forcing the same up into the form of blank shown in Fig. 2. The plunger being withdrawn, the mold is partially filled with the blank 12. (*Vide* Fig. 3.) It will be noted that the metal forming the blank has been forced into a recess 13 in the upper section 9 of the mold, which recess, as shown in the drawings, is in the form of an annular groove. The halves of the lower section 10 of the mold are now separated, so that the lower section 10 is disengaged from the upper section 9, and the blank 12 is left depending from the upper section 9, being conveniently held therein by the engagment between the blank 12 and the groove 13. Although the glass will still be hot enough to complete the formation of the article by blowing or by other similar means, the blank will be cooler at its outer face as compared with its interior, and the surface which has come in contact with the mold will bear the marks of the mold and the marks showing the "grain" of the metal forming the mold. To enable me to eliminate these marks, which would otherwise appear on the finished article and mar the surface of the same, as well as to facilitate the completion of the article to be formed from the blank, I now reheat the blank which has been so molded by exposing the same within the glory-hole 14 (*vide* Fig. 4) of a glass-furnace, said glory-hole being heated in a familiar manner, fuel being supplied thereto through pipes 15. The surface of the blank 12 having been thus reheated and resoftened, a suitable finishing-mold 16 and blower-head 17 having been clamped upon the upper end of the mold-section 9, said blower-head communicating with a blowing-pipe 18, the blank 12 is brought to finished form by air-pressure, whereupon the halves of the mold 16 and the mold-section 9 are swung open and the finished article is removed.

In the drawings I have for convenience shown the mold 16 as a paste-mold, which of course would be used in case a high finish is desired. Such a mold is usually used in connection with suitable mechanism for revolving the same while the blank 12 is being blown to form; but I have not shown such mechanism, as its construction and use are well known in this art. So, also, while I have described the process as involving the blowing of the blank 12 to final form in the mold 16 it will be understood that the blank may be in part or wholly formed by blowing while within or immediately after its removal from the glory-hole. So, again, while I have described my process as involving the finishing of the blank by pneumatic pressure it will be understood that the use of either direct or induced air-pressure is entirely within the spirit of my invention. So, also, various changes in details may be made without departing from the spirit of my invention, and the metal may be gathered for formation into the blank in any suitable manner as well as in the precise manner hereinabove described.

It will thus be observed that the essential features of my process comprise molding the glass into a blank, reheating the blank, and then expanding the blank to its final form. Preferably the blank should be reheated and expanded to finished form from the initial heating, and I also prefer to at least slightly expand the blank during the period of reheating, so as to thereby most effectively remove the mold-marks.

While I have shown and described the blank as being partially hollowed by the use of a plunger before reheating and while I prefer to practice my process in that way, it is not at all essential that the blank be hollowed before reheating.

My process is adapted to the manufacture of hollow glass articles of any shape or form, although I have merely shown and described it as applied to the manufacture of glass bulbs for incandescent lamps.

I claim—

1. The process of manufacturing hollow glass articles, which comprises forming a blank by casting fluid glass, in the presence of a high temperature, whereby the metal is maintained in a sufficiently fluid condition, reheating the blank so formed, and then expanding the blank to final form.

2. The process of making hollow glass articles, which comprises shaping molten glass into a blank, removing said blank while still retaining most of its initial heat to a reheating zone, reheating the exterior of that blank and then confining it to finished form and maintaining a rotation of movement between the blank and the finishing-mold.

3. The process of making hollow glass articles, which comprises shaping molten glass into a blank in the presence of a high temperature in a mold, immediately reheating the exterior of the blank while the glass is still plastic and retaining most of the initial heat and then manipulating the blank to final form.

4. The process of manufacturing hollow glass articles, which comprises casting fluid glass into incomplete form, in the presence of a high temperature, whereby the metal is maintained in a sufficiently fluid condition, removing and reheating the blank thus formed, while still plastic, and finally expanding the blank to final form.

5. The process of making hollow glass articles, which comprises charging a mold directly from a supply of molten glass in the presence of a high temperature whereby the metal is maintained in a sufficiently fluid condition, reheating the exterior of the blank so formed while still plastic, expanding the blank to final form, and simultaneously effecting a relative rotation between the blank and the final forming means.

6. The process of making hollow glass articles, which comprises shaping molten glass into a blank in the presence of a high temperature whereby the blank is maintained in a sufficiently fluid condition, reheating the blank while still plastic, expanding the blank during the reheating step, and subsequently manipulating the blank to final form.

7. The process of making hollow glass articles, which comprises flowing molten glass into a mold in the presence of a high temperature whereby the blank is maintained in a sufficiently fluid condition, pressing the glass while in the mold, reheating the blank so formed while still plastic, and subsequently expanding the blank to final form.

8. The process of making glass articles, which comprises forming a blank within a mold in the presence of a high temperature, reheating the blank while still plastic and retaining most of its initial heat, and expanding the blank to final form before is has cooled.

9. The process of making glass articles, which comprises flowing molten metal into a mold in the presence of a high temperature, pressing the blank so obtained, reheating the blank while still plastic and retaining most of its initial heat, partially expanding the blank during the reheating step, and expanding the blank to final form.

10. The process of making glass articles which comprises flowing molten metal into a sectional mold, in the presence of a high temperature, to form a blank, the upper portion of which is in engagement with a removable section of the mold, immediately disengaging the said removable section, with the blank suspended therefrom, from the mold, immediately inserting the depending portion of the blank into a reheating zone of a high, and substantially uniform, temperature, reheating the blank therein, removing the blank, still depending from said portion of the sectional mold, from said zone, and expanding the blank to final form.

11. The process of making glass articles, which comprises flowing molten metal into a sectional mold, in the presence of a high temperature, to form a blank having the upper portion thereof secured within a removable section of said mold, immediately inserting the depending portion of said blank into a reheating zone of substantially uniform temperature, reheating the blank within said zone and simultaneously partially expanding the blank, removing the blank still depending from the portion of the sectional mold, inserting the reheated blank in a finishing-mold, and blowing the blank to final form within said finishing-mold.

SOLON O. RICHARDSON, Jr.

Witnesses:
JOHN H. WRIGHT,
FRED E. WOLF.

---

It is hereby certified that in Letters Patent No. 760,150, granted May 17, 1904, upon the application of Solon O. Richardson, Jr., of Toledo, Ohio, for an improvement in the "Art of Manufacturing Hollow Glass Articles," errors appear in the printed specification requiring correction, as follows: On page 2, line 81, after the word "confining" the words *the blank and expanding* should be inserted, and in line 89, same page, the word "the" should read *its;* and that the said Letters Patent should be read with these corrections therein that the same may conform to the record of the case in the Patent Office.

Signed and sealed this 14th day of June, A. D., 1904.

[SEAL.]

E. B. MOORE,
*Acting Commissioner of Patents.* mold in the presence of a high temperature, reheating the blank while still plastic and retaining most of its initial heat, and expanding the blank to final form before is has cooled.

9. The process of making glass articles, which comprises flowing molten metal into a mold in the presence of a high temperature, pressing the blank so obtained, reheating the blank while still plastic and retaining most of its initial heat, partially expanding the blank during the reheating step, and expanding the blank to final form.

10. The process of making glass articles which comprises flowing molten metal into a sectional mold, in the presence of a high temperature, to form a blank, the upper portion of which is in engagement with a removable section of the mold, immediately disengaging the said removable section, with the blank suspended therefrom, from the mold, immediately inserting the depending portion of the blank into a reheating zone of a high, and substantially uniform, temperature, reheating the blank therein, removing the blank, still depending from said portion of the sectional mold, from said zone, and expanding the blank to final form.

11. The process of making glass articles, which comprises flowing molten metal into a sectional mold, in the presence of a high temperature, to form a blank having the upper portion thereof secured within a removable section of said mold, immediately inserting the depending portion of said blank into a reheating zone of substantially uniform temperature, reheating the blank within said zone and simultaneously partially expanding the blank, removing the blank still depending from the portion of the sectional mold, inserting the reheated blank in a finishing-mold, and blowing the blank to final form within said finishing-mold.

SOLON O. RICHARDSON, JR.

Witnesses:
JOHN H. WRIGHT,
FRED E. WOLF.

---

Corrections in Letters Patent No. 760,150.

It is hereby certified that in Letters Patent No. 760,150, granted May 17, 1904, upon the application of Solon O. Richardson, Jr., of Toledo, Ohio, for an improvement in the "Art of Manufacturing Hollow Glass Articles," errors appear in the printed specification requiring correction, as follows: On page 2, line 81, after the word "confining" the words *the blank and expanding* should be inserted, and in line 89, same page, the word "the" should read *its;* and that the said Letters Patent should be read with these corrections therein that the same may conform to the record of the case in the Patent Office.

Signed and sealed this 14th day of June, A. D., 1904.

[SEAL.]

E. B. MOORE,
*Acting Commissioner of Patents.*

Corrections in Letters Patent No. 760,150.

It is hereby certified that in Letters Patent No. 760,150, granted May 17, 1904, upon the application of Solon O. Richardson, Jr., of Toledo, Ohio, for an improvement in the "Art of Manufacturing Hollow Glass Articles," errors appear in the printed specification requiring correction, as follows: On page 2, line 81, after the word "confining" the words *the blank and expanding* should be inserted, and in line 89, same page, the word "the" should read *its;* and that the said Letters Patent should be read with these corrections therein that the same may conform to the record of the case in the Patent Office.

Signed and sealed this 14th day of June, A. D., 1904.

[SEAL.]

E. B. MOORE,
*Acting Commissioner of Patents.*